United States Patent [19]

Rudolph

[11] Patent Number: 5,690,430
[45] Date of Patent: Nov. 25, 1997

[54] APPARATUS AND METHOD FOR MEASURING TEMPERATURE AND/OR EMISSIVITY OF STEEL STRIP DURING A COATING PROCESS

[75] Inventor: Ralph G. Rudolph, Center Valley, Pa.

[73] Assignee: Bethlehem Steel Corporation, Del.

[21] Appl. No.: 616,894

[22] Filed: Mar. 15, 1996

[51] Int. Cl.$^6$ ........................................... G01J 5/00
[52] U.S. Cl. .................. 374/126; 374/9; 374/126; 250/338.3; 250/341.7
[58] Field of Search ................ 374/9, 121, 126, 374/128, 132; 250/338.3, 340, 341.1, 341.7, 571; 364/557

[56] References Cited

U.S. PATENT DOCUMENTS

| | | |
|---|---|---|
| 2,707,881 | 5/1955 | Gier et al. . |
| 3,179,805 | 4/1965 | Astheimer . |
| 3,537,314 | 11/1970 | Svet . |
| 3,539,807 | 11/1970 | Bickel . |
| 3,796,099 | 3/1974 | Shimotsuma . |
| 3,922,550 | 11/1975 | Crowley et al. . |
| 4,172,383 | 10/1979 | Iuchi . |
| 4,313,344 | 2/1982 | Brogardh et al. . |
| 4,408,878 | 10/1983 | Fischbach . |
| 4,408,903 | 10/1983 | Baldasarri . |
| 4,465,382 | 8/1984 | Iuchi et al. . |
| 4,553,854 | 11/1985 | Yamada et al. . |
| 4,579,461 | 4/1986 | Rudolph . |
| 4,652,143 | 3/1987 | Wickersheim . |
| 4,659,234 | 4/1987 | Brouwer et al. . |
| 4,708,493 | 11/1987 | Stein . |
| 4,789,992 | 12/1988 | Wickersheim . |
| 4,881,823 | 11/1989 | Tanaka et al. . |
| 4,979,133 | 12/1990 | Arima et al. ................. 374/9 X |
| 5,021,980 | 6/1991 | Poenisch et al. . |
| 5,132,922 | 7/1992 | Khan et al. . |
| 5,165,796 | 11/1992 | Gat et al. . |
| 5,551,780 | 9/1996 | Wintrich et al. ............. 374/121 X |

FOREIGN PATENT DOCUMENTS 55-144513  11/1980  Japan ........................... 374/9

OTHER PUBLICATIONS

N. S. Tskhai, Spectral Methods Of Determing The Emissivity Of Hot Surfaces, Journal of Applied Spectroscopy, vol. 27, No. 3, 1977 Sep. 1977.

*Primary Examiner*—Elizabeth L. Dougherty
*Assistant Examiner*—Paul D. Amrozowicz

[57] ABSTRACT

Method and apparatus for measuring the surface temperature/emissivity of coated steel strip during a coating (e.g., galvannealing) process. The apparatus includes first and second radiation sensors each having a response exponentially related to the reciprocal of absolute temperature when viewing a blackbody source, and each positioned to receive focused radiation from the surface to be measured to provide first and second signals indicative of the radiation received by the sensor, respectively. To provide the focused radiation, the apparatus includes an optical system for gathering thermal radiation emitted by the surface to be measured and focusing it onto the sensors after a first common filter and second individual filters of differing wavelengths such that the first sensor is responsive to shorter wavelengths, the second sensor is responsive to longer wavelengths, and both sensors view the same area simultaneously. Finally, a processing means is provided for processing the two sensor signals to determine temperature/emissivity. Several variations of the processing means are provided including one which uses a Ratio Correction Factor (RCF) and an apparent emissivity (ECA) for determining temperature/emissivity while another one uses a Black Body Deviation Factor (BBDF).

23 Claims, 10 Drawing Sheets

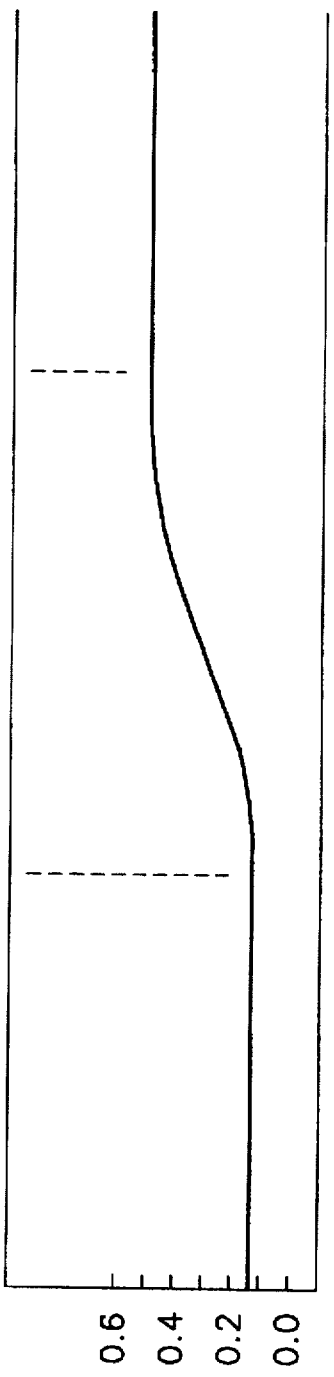
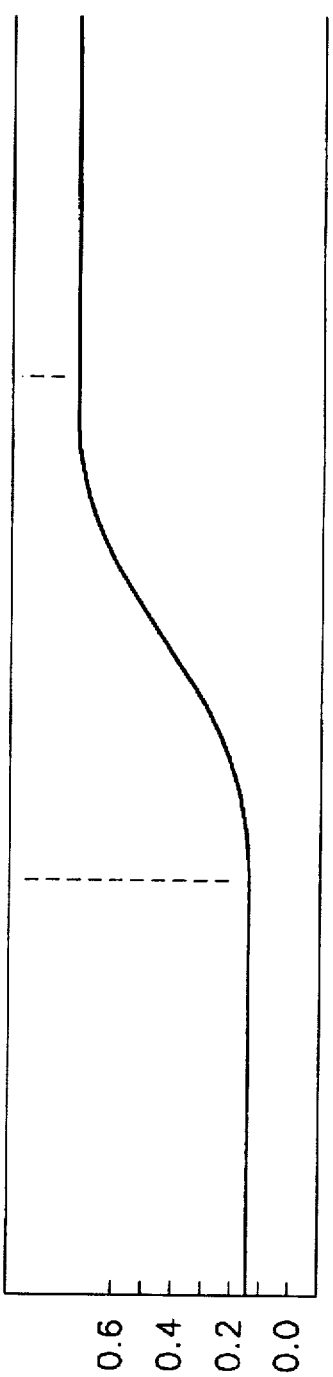

APPARATUS AND METHOD FOR MEASURING TEMPERATURE AND/OR EMISSIVITY OF STEEL STRIP DURING A COATING PROCESS

FIELD OF THE INVENTION

The present invention relates to the control of a coating process and, more particularly, it relates to determining the temperature and/or emissivity during coating for controlling the process.

BACKGROUND OF THE INVENTION

Galvannealed steel strip is produced by applying a coating of liquid zinc to the strip surface and maintaining the coated strip at a sufficiently high temperature to allow intermetallic iron-zinc compounds to form in the coating. A more detailed description of the process is presented in *The Making, Shaping and Treating of Steel*, Association of Iron and Steel Engineers, 10th Edition, Chapter 38, pgs. 1173–1190 (1985) which is herein incorporated by reference.

The exact "annealing" temperature and annealing time should be closely controlled to generate a coating with properties meeting customer specifications.

To control annealing temperature, of course, it is advantageous to be able to measure that temperature at various points throughout the galvanneal process. As the surface coating at the point where measurements are to be made may still be liquid, however, the measurement is desirably taken using non-contacting techniques to avoid damaging the strip surface.

Attempting to use the emitted radiation is a non-contacting technique. During the annealing process, the coating changes from that of liquid zinc through several different stages to a final grey diffuse surface. The amount of thermal radiation emitted from the surface, even when held at a constant temperature, depends upon how far annealing has progressed. Liquid zinc, as an example, emits very little thermal radiation, while the final annealed surface is a relatively high radiation emitter. The change in the amount of radiation emitted also depends on the wavelength of the radiation, and is different for each wavelength. Hence, the ratio of emissivities at two different wavelengths also changes with the state of annealing.

For surfaces that are of constant emissivity or constant ratio of emissivities at two different wavelengths, conventional radiation thermometers (RTs) can be used to measure temperatures based on the amount of thermal radiation emitted from the surface. For such RTs, it is necessary to know and enter an emissivity or emissivity-ratio number into the RT to obtain a correct temperature indication. Such RTs cannot be used for galvanneal because both the emissivity and emissivity-ratio are changing.

A wide variety of special-purpose devices also exist for measuring the temperature of varying emissivity surfaces. Such devices usually incorporate one or more sources of known temperature external radiation or may incorporate reflectors in an attempt to measure emissivity or create pseudo-constant emissivity conditions. These devices often work satisfactorily if the position of the product surface is constant and the product emissivity does not change too rapidly. In galvannealing, however, a very long length of unconstrained steel strip between a coating pot and a top roll results in considerable strip movement so that these special-purpose devices are not effective.

Attempting to measure the temperature of galvanneal is such a difficult challenge that, over five years ago, the American Iron and Steel Institute (AISI) surveyed all member firms for a list of most-needed inventions in the steel industry. A priority on their list of needed inventions was: a means to measure the temperature of steel strip being galvannealed. AISI sent out an RFP (Request For Proposal) to many different manufacturers and laboratories. No one had any means to make this measurement using radiation thermometers. As no workable methods seemed to be available, AISI decided to fund Oak Ridge National Labs to pursue a new type of ultraviolet-pulsed phosphor system that is not a radiation thermometer.

Consequently, various steel companies, universities and radiation thermometer manufacturers, sparked by this need, independently pursued development of some type of radiation thermometer capable of making this measurement.

Accordingly, an important goal of the present invention is a non-contacting radiation thermometer system capable of measuring and indicating the temperature and/or emissivity of galvannealing steel strip that may have a fluctuating passline and rapid changes in emissivity.

SUMMARY OF THE INVENTION

The present invention involves a method and apparatus for measuring the surface temperature and emissivity of coated steel strip during a coating process including a first radiation sensor for receiving radiation from an area on the surface of the coated steel strip and for providing a first signal indicative of the radiation received; a second radiation sensor, separate from said first radiation sensor, for receiving radiation from the same area on the surface of the coated steel strip and for providing a second signal indicative of the radiation received; filters for passing differing wavelengths of the received radiation to the first and second sensors such that the first sensor is responsive to shorter wavelengths than the second sensor; and processing means for processing the two signals indicative of radiation to determine at least one of temperature and emissivity.

BRIEF DESCRIPTION OF THE FIGURES

The aspects, features and advantages of the present invention will be more readily understood from the following detailed description when read in conjunction with the accompanying drawings, in which:

FIGS. 2a and 2b show graphs (also referred to as strip charts) illustrating an approximate emissivity behavior of the coating during annealing (state of annealing versus emissivity) for long and short wavelengths, respectively.

DETAILED DESCRIPTION OF THE INVENTION

The present invention is generally directed to a non-contacting radiation thermometer system capable of measuring and indicating both the temperature and emissivity of galvannealing steel strip which may have a fluctuating passline and rapid changes in emissivity. For purposes of this specification, "fluctuating passline" means, due to a somewhat unsupported, rapidly advancing steel strip, the distance between the steel strip and some fixed point along a perpendicular plane intersecting the plane of the steel strip can change. That is to say, the coated steel strip tends to oscillate and, consequently, create a fluctuating passline.

Overview of Galvannealing Line

Figure 1:
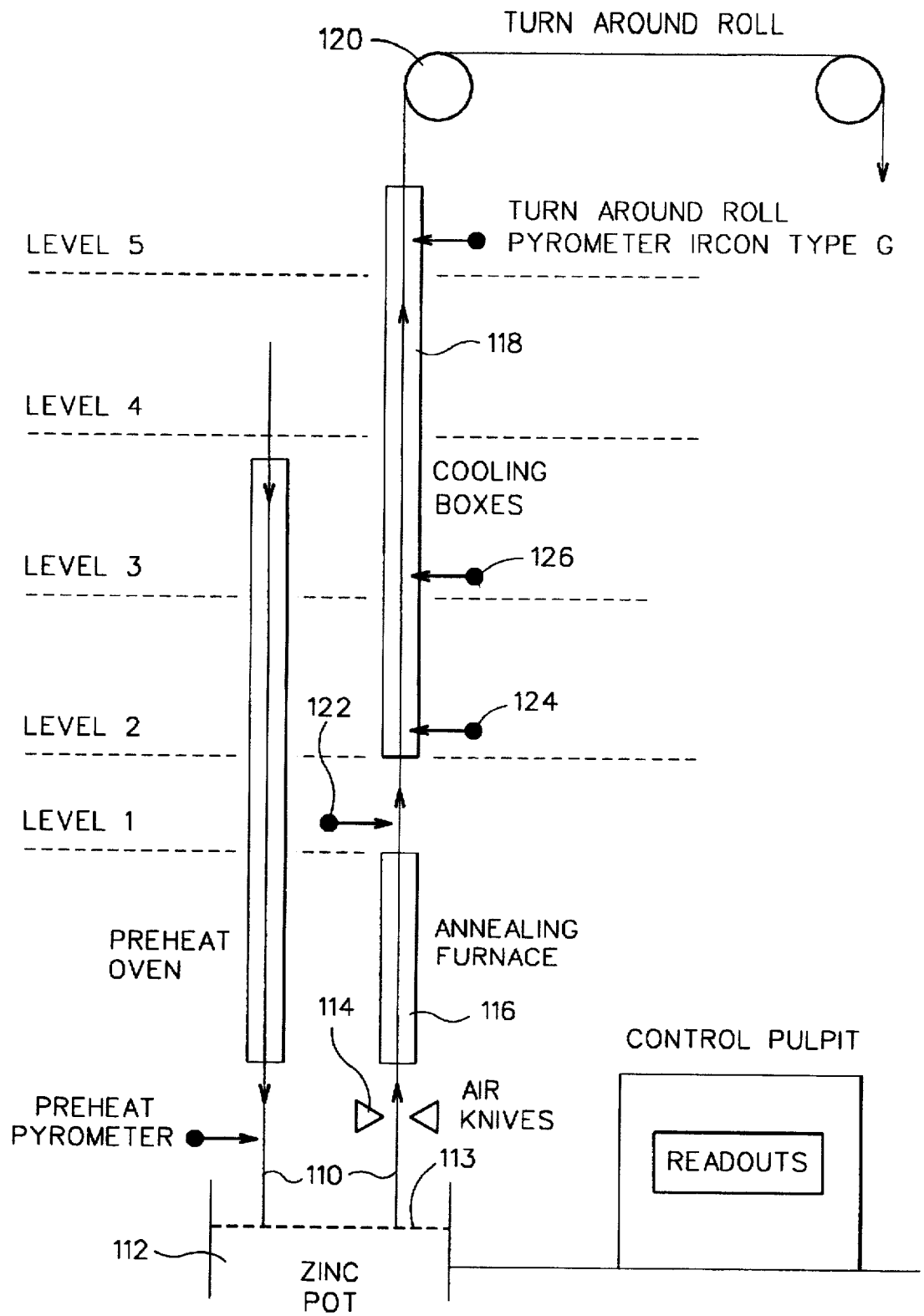
FIG. 1 is a diagram illustrating an exemplary layout of the coating portion of a galvannealing line.

To better understand and appreciate the present invention, with reference to FIG. 1, an exemplary layout/process for coating (e.g., galvannealing) steel strip is described.

As shown in FIG. 1, continuously moving steel strip 110, travelling at approximately 300 feet per minute, enters a coating pot 112 containing liquid zinc 113. As the steel strip, now carrying liquid zinc, exits coating pot 112, coating "knives" 114 strip off excess molten zinc, leaving the strip coated with a thin layer of liquid zinc. The coated strip passes through an annealing furnace 116 which heats the coated strip. The greater the heating, the more rapid the annealing. Of course, thicker coatings require more time to anneal or require higher temperatures or both.

Turning to FIGS. 2a and 2b briefly, these figures show graphs illustrating an approximate emissivity behavior of the coating during annealing (state of annealing versus emissivity) for long and short wavelengths, respectively. As shown, the emissivity of the strip coating, once intermetallic compounds have started to form at the surface, undergoes rapid changes in emissivity. This often takes place within the annealing furnace 116 so that the emissivity of the strip exiting the annealing furnace 116 is unknown. Thus, it is desirable to determine this parameter for control purposes.

Continuing with FIG. 1, once the coated strip exits the furnace 116, it passes through "cooling boxes" 118 and starts to cool through both convection and radiation. It should be noted that "cooling boxes" 118 are actually large racks of cooling pipes with two headers. And, as described below, provide a base on which a radiation thermometer operating in accordance with the present invention can be secured.

Once the strip cools to less than about 800° F., all annealing actions cease. Such cooling to less than 800° F. desirably occurs before the strip reaches the turn-around roll 120. Thus, it is important to monitor and control the temperature of the coated strip from the time it exits the coating pot 112 until the time it reaches the turn-around roll 120.

To do so, at least one, but preferably more than one, radiation thermometer operating in accordance with the present invention is operatively positioned along the galvannealing line. For example, in the exemplary embodiment of the present invention, radiation thermometers operating in accordance with the present invention, are located at positions 122, 124 and 126 where positions 124 and 126 are the preferred locations. It should be noted that in the exemplary embodiment of the present invention, the thermometers are located approximately 1–5 feet from the area on the coated strip to be viewed.

Gathering information at these locations regarding emissivity and temperature allows for more accurate control of the overall galvannealing process. For instance, items which may be controlled, individually or in various combinations, with this information to better maintain temperature and produce better yields include the temperature of the annealing furnace 116, cooling rate controlled by the cooling boxes 118, the speed of the steel strip, the coating thickness, the amount of Al in the coating thickness, and various other items which impact the results of the galvannealing process.

With this understanding of the overall galvannealing process in mind, a description of both the structural and processing aspects of a radiation thermometer operating in accordance with the present invention is provided below.

Structural Design of Radiation Thermometer

Generally, the radiation thermometer has two sensors simultaneously responsive to different thermal radiation wavelengths. The outputs of the sensors are specially processed, as described in detail below, to produce the temperature and emissivity values.

Figure 3:
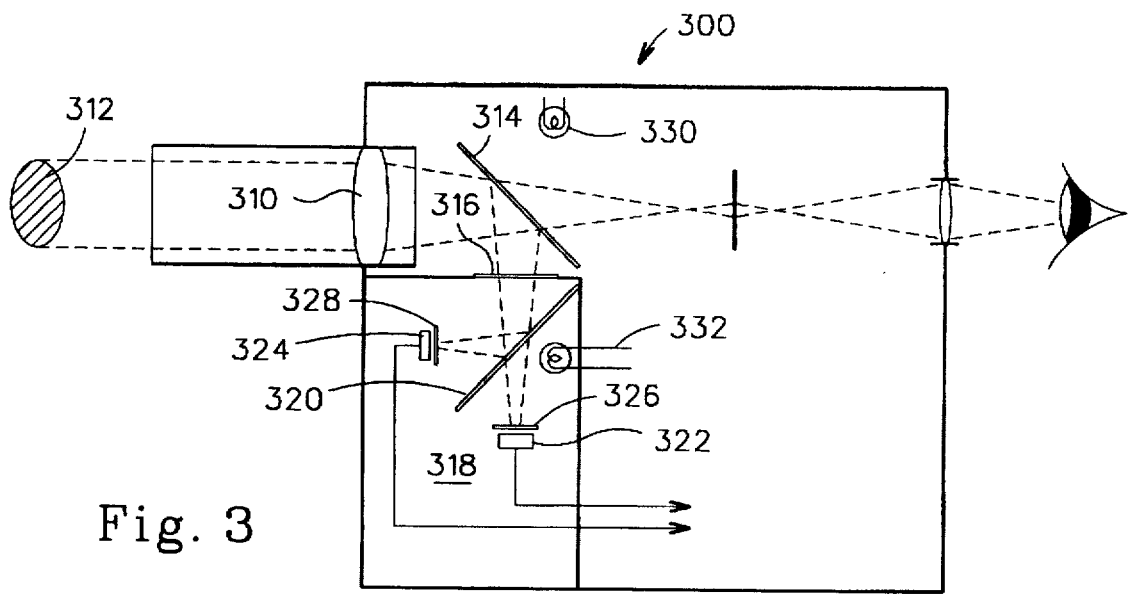
FIG. 3 is a diagram illustrating an exemplary embodiment of a radiation thermometer radiation sensing head suitable for use with the present invention.

FIG. 3 is a diagram illustrating an exemplary embodiment of a radiation thermometer radiation sensing head 300 suitable for use with the present invention. As shown in FIG. 3, a focusable lens 310 is used to image an area of, for example, a moving strip 312 to be measured. A beam splitter 314, as indicated by the dotted lines, directs part of the received radiation towards viewing optics and part towards the sensor arrangement. Beam splitter 314 may be dichroic, separating infra red from non-infra red radiation.

The radiation directed towards the sensor arrangement passes through a sharp cutoff long-pass filter 316 that forms a window in an otherwise sealed box 318. Filter 316, in the exemplary embodiment of the present invention, allows only radiation longer than 1.0 microns to enter the box 318.

Within the box 318, a second beam splitter 320 directs ½ the radiation towards each of two precisely aligned sensors 322 and 324. A short pass filter 326 is located in front of sensor 322. A long-pass filter 328 is located in front of sensor 324.

Figure 4A:
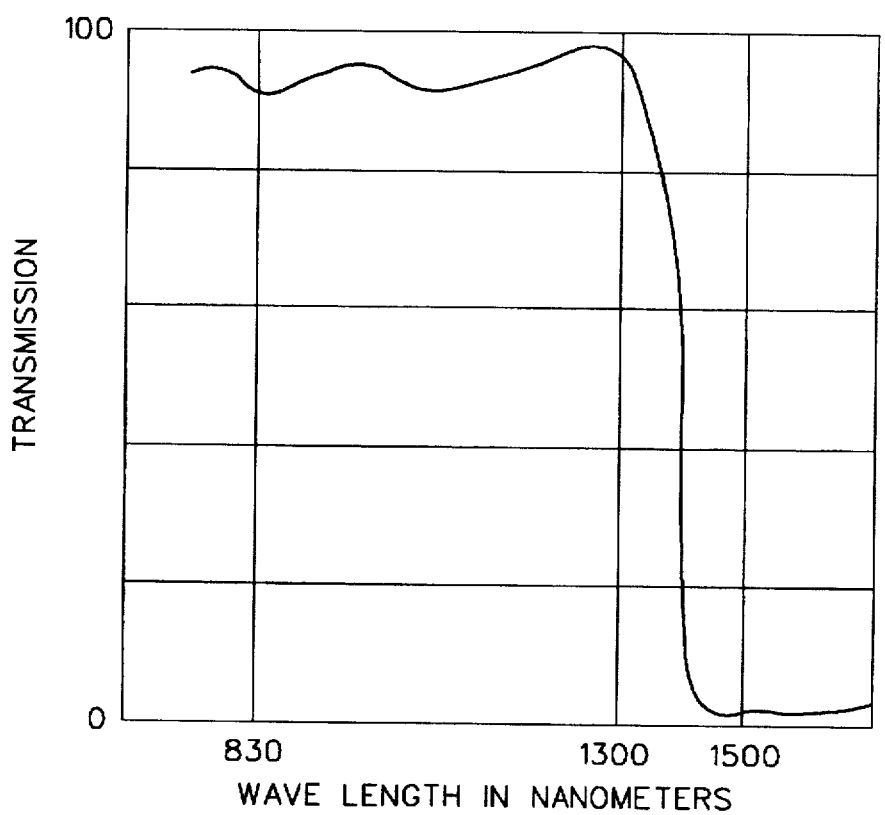
FIGS. 4a and 4b show graphs illustrating the optical characteristics of exemplary short and long wavelength filters suitable for use with the thermal radiation sensors of the present invention.
Figure 4B:
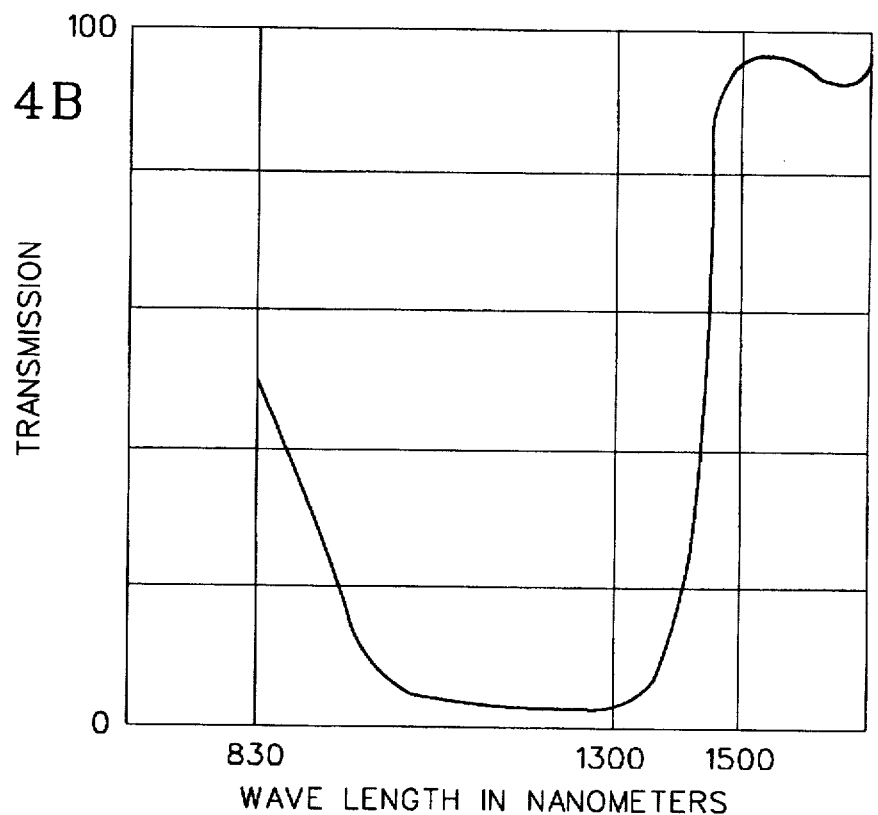
Figure 4C:
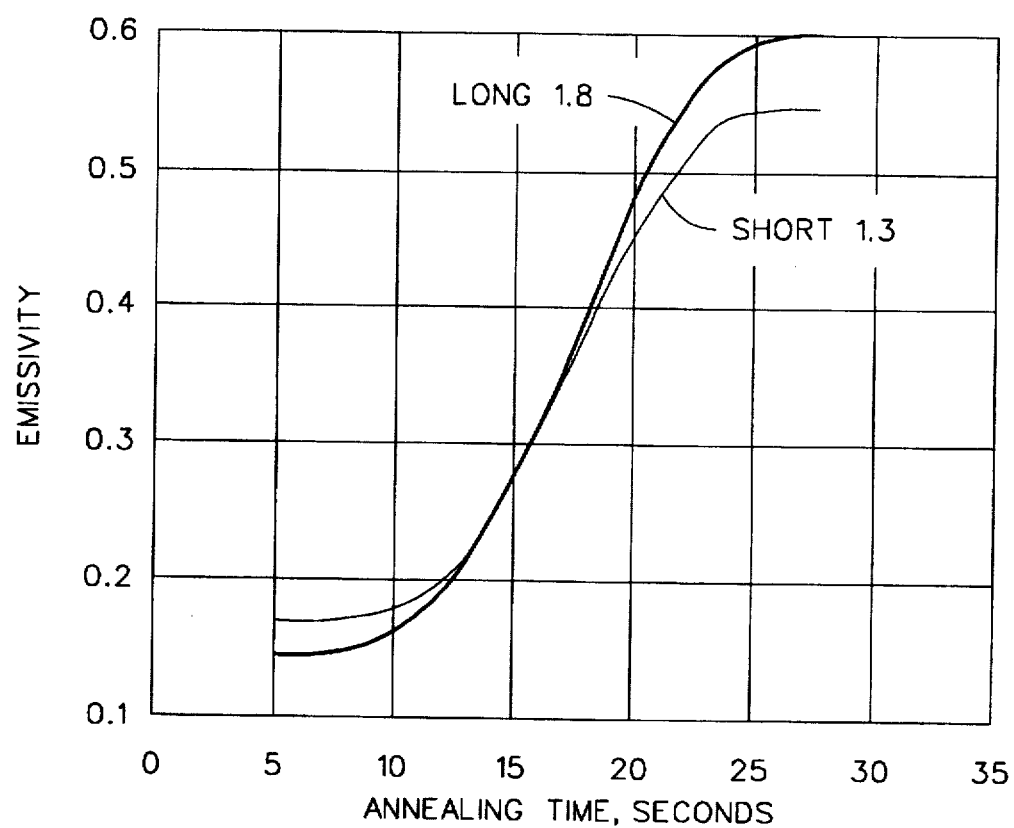
FIG. 4c shows a graph illustrating an approximate emissivity behavior of the coating during annealing (time of annealing versus emissivity) for long and short wavelengths.

It should be noted that, in the exemplary embodiment of the present invention, short pass filter 326 has a cutoff at 1.3 microns. Thus, the combination of the input filter 316 and filter 326 restrict sensor 322 to receive radiation between 1.0 and 1.3 microns. A long-pass filter 328, with transmittance beginning at 1.5 microns, is located in front of sensor 324. The sensors 322 and 324 are responsive only to wavelengths shorter than 1.8 microns, so the combination of filters 316, 328 limit sensor 324 to be responsive only to wavelengths between 1.5 and 1.8 microns. FIGS. 4a and 4b show graphs illustrating the optical characteristics of exemplary short and long wavelength filters suitable for use with the present invention. FIG. 4c shows a graph illustrating the relationship of emissivity to annealing time for the short and long wavelengths.

The selection of the wavelengths was based on the assumptions that insufficient energy exists below 1 micron for practical purposes of the present invention and atmospheric absorbance may detrimentally effect readings for wavelengths between 2–8 microns. Accordingly, the preferred short and long wavelengths selected for the radiation thermometer were between 1–2 microns.

The sensing head used in the radiation thermometer is precision machined and optically aligned to ensure that both sensors 322 and 324 simultaneously view exactly the same area of the surface to be measured. This feature of simultaneous viewing is important because the amount of annealing and emissivity can exhibit wide localized variations, especially on a moving target. Thus, in the preferred embodiment of this invention, both sensors 322, 324 desirably view the same area simultaneously. Additionally, the same area which the sensors simultaneously view is preferably around the center of the steel strip due to variations around the edges of the steel strip.

Moreover, in the exemplary embodiment of the present invention, sensors 322 and 324 are germanium sensors which are sensitive to ambient temperature. That is, the germanium sensors experience a large drift in response as a function of ambient temperature. Thus, on-sensor thermistors are used to control the accuracy of the sensors.

The sensor output currents are amplified and converted to voltages by standard precision chopper-stabilized amplifiers to produce an output of 4.000 volts when viewing a blackbody source at 1050° F. and zero volts when all radiation is blocked. All electronics including power supplies are carefully designed to be stable over the ambient temperature range of 50° F. to 150° F.

Two small current-regulated incandescent calibration lights 330 and 332 can be activated via a remote signal. When properly calibrated and when activated, they cause the sensors to output known signals when outside radiation is blocked.

Figure 5B:
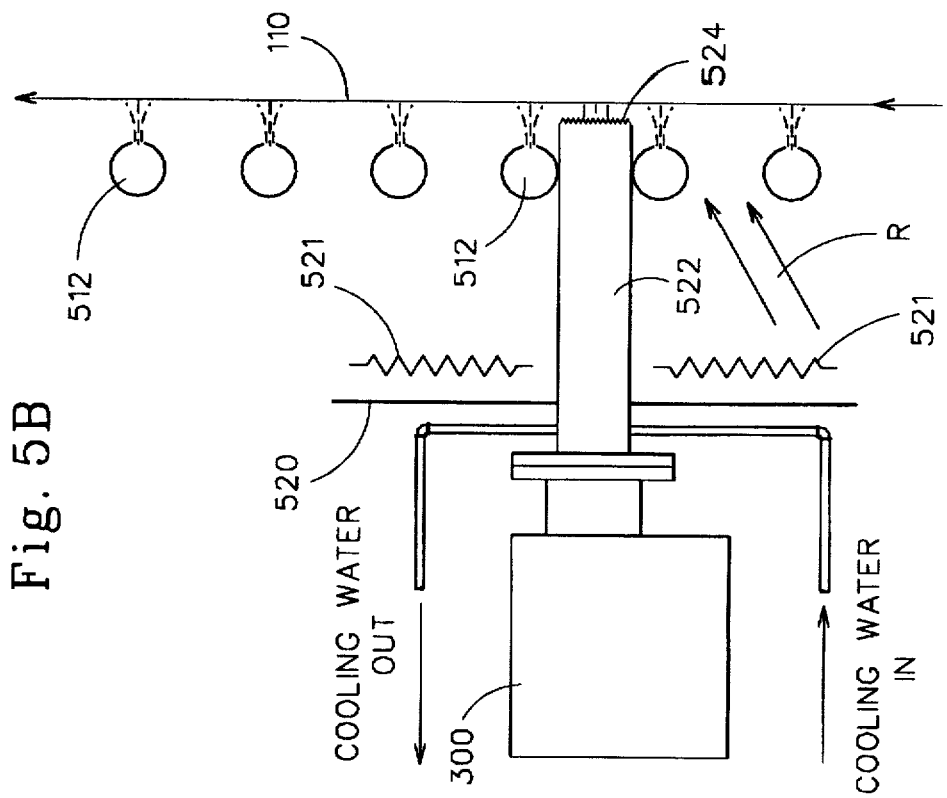
FIGS. 5a and 5b show diagrams illustrating first and second exemplary installations of the radiation thermometer shown in FIG. 3.
Figure 5A:
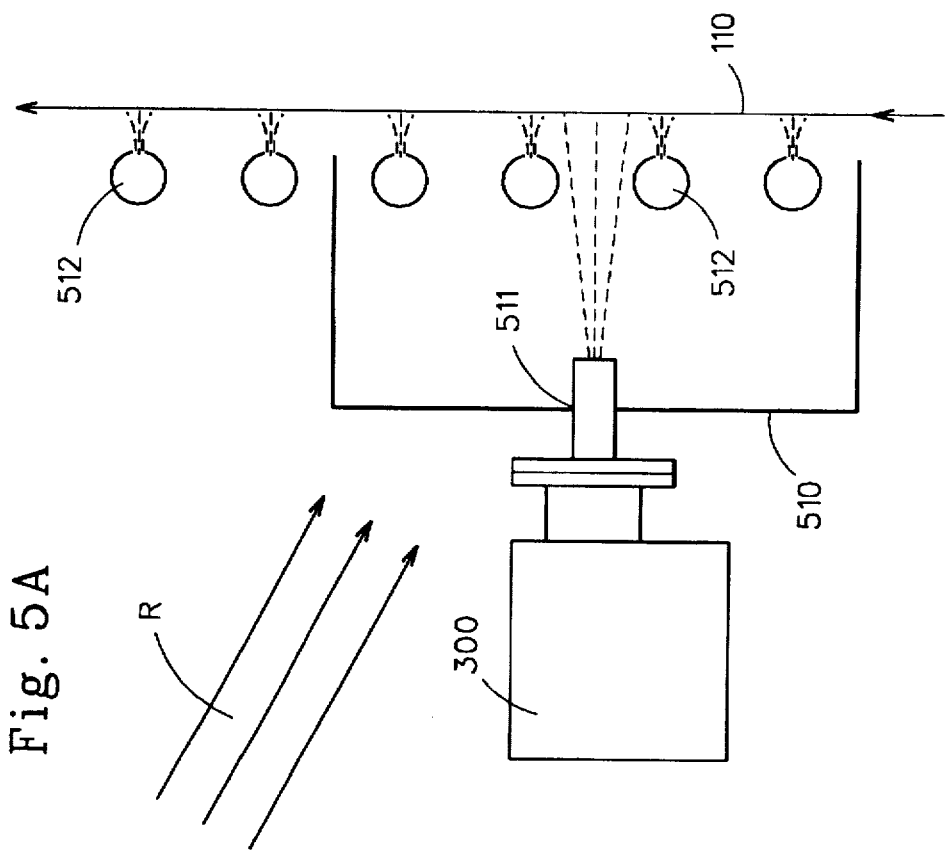

FIGS. 5a and 5b are diagrams illustrating two exemplary embodiments of an installation of the radiation thermometer shown in FIG. 3.

As is understood by those skilled in the art, real surfaces not only emit thermal radiation but also can reflect thermal radiation emitted from nearby hot surfaces. To measure temperature using emitted radiation as in the present invention, it is desirable to prevent the radiation thermometer from viewing any additional reflected radiation "R" that may be present in the vicinity. The amount of reduction in reflected radiation that is necessary depends on the physical and thermal design of the installation and on the possible surface states of the product. Generally, the worst case exists when the product surface is both diffuse and of high reflectivity as in the initial stages of annealing.

For the present invention, as illustrated in FIGS. 5a and 5b, two different techniques have been used to minimize the amount of reflected radiation. In the first embodiment, shown in FIG. 5a, a radiation-absorbing wall 510 is interposed between the radiation thermometer 300 and the strip 110, with the radiation thermometer viewing the product through a hole 511 in the wall 510. In the exemplary embodiment of the present invention, the wall 510 is maintained approximately at least 500° F. cooler than the strip surface.

In the second embodiment, shown in FIG. 5b, in addition to cooling tubes 512, heaters 521 are present to enable either cooling or heating at this point in the annealing process. In this configuration, external radiation "R" may come from various sources including the heaters 521. As such, the radiation thermometer 300 is mounted with an air-purged and water-cooled "sight tube" 522 with a cooled end flange plate 524 which, in the present invention, is machined with grooves and blackened or oxidized to increase radiation absorption. It is noted that, in the exemplary embodiment of the present invention, the grooves are 60° concentric or spiral vee grooves. Additionally, the flanged end 524 is designed to have as large a diameter as practical and to be as close to the strip 110 as practical. Furthermore, it should be sufficiently cooled to be at least 500° F. cooler than the strip area being viewed.

First Embodiment of Processing the Signals

Figure 6:
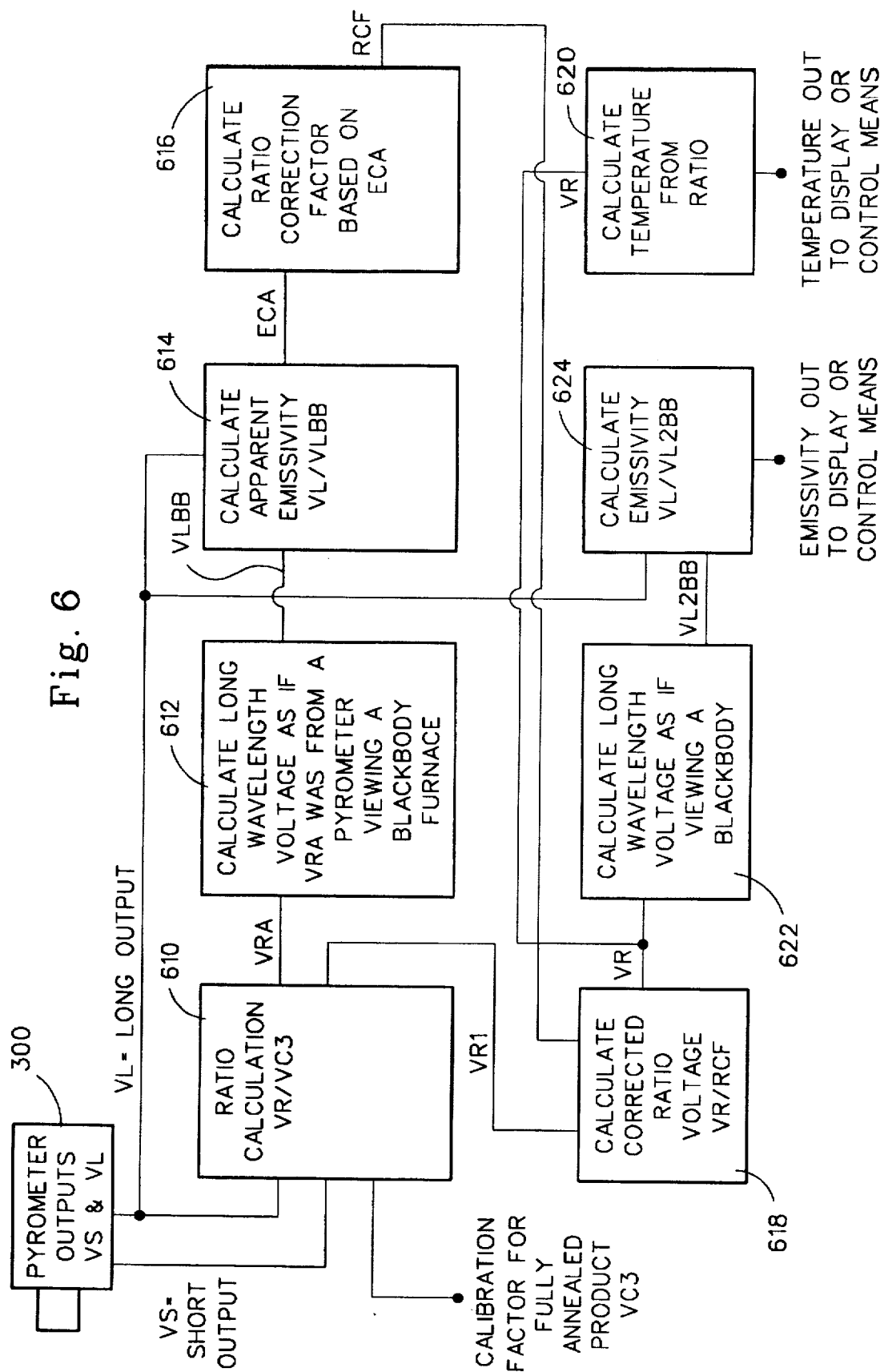
FIG. 6 shows a high-level functional block diagram illustrating a first exemplary technique for processing the radiation signals received by a radiation sensing head such as the one shown in FIG. 3.

FIG. 6 shows a high-level functional block diagram illustrating a first exemplary technique for processing the radiation signals received by a radiation sensing head such as the one shown in FIG. 3. It is noted that, although depicted external to radiation thermometer 300, the hardware and/or software used for processing may be contained within radiation thermometer 300.

For processing, signals Vs and Vl, provided by the sensors 322 and 324, are sent via a signal cable to a signal processing unit (where Vs stands for the short wavelength signal and Vl stands for the long wavelength signal). As shown in FIG. 3, these signals may be represented by the mathematical equation:

$$Vs = (As \times Es) \times e^{-Bs/T} \quad (1)$$

$$Vl = (Al \times El) \times e^{-Bl/T} \quad (2)$$

where:

As=a constant

Es=emissivity at short equivalent wavelength

Bs=equivalent short wavelength constant

Al=a constant

El=emissivity at long equivalent wavelength

Bl=equivalent long wavelength constant

T=Temperature of area viewed in degrees Kelvin

Within the processing unit, voltages Vs and Vl are processed to produce indicated temperature and emissivity.

The various stages of signal processing are described below:

Initially, Vs is divided by Vl to produce a ratio voltage VRl. Next, VRl is then divided by an externally entered voltage VC3 that is numerically equal to the ratio Es/El for fully annealed product (as determined by laboratory tests) to produce a ratio voltage VRA. Both VRl and VRA are generated in functional block 610.

When the radiation thermometer views fully annealed product, the voltage VRA then becomes the same value as a regular ratio-type radiation thermometer when viewing a calibration furnace where Es=El=1.0.

$$VRl = Vs/Vl = (As/Al) \times (Es/El) \times e^{-(Bs-Bl)/TA} \quad (3)$$

$$VRA = VRl/VC3 \text{ where } VC3 = (Es/El) \text{ for fully annealed product only} \quad (4)$$

$$TA = (Bs-Bl)/(ln(VRl) - ln(As/Al) - ln((Es/El)/VC3)) \quad (5)$$

And ln((Es/El)/VC3))=0 for fully annealed product.

Given this value of TA (which is correct for fully annealed product), a value designated VLBB is calculated in functional block 612, where VLBB is the voltage V1 would be if the radiation thermometer were viewing a blackbody calibration furnace running at temperature TA:

$$VLBB = Al \times e^{-Bl/TA} \quad (6)$$

As represented by functional block 614, taking the ratio of V1/VLBB, an apparent emissivity (ECA) is calculated which is correct for fully annealed product:

$$ECA = V1/VLBB \quad (7)$$

For product that is progressively less annealed, the temperature TA calculated becomes proportionately high. Hence, VLBB becomes progressively too high and ECA similarly becomes too low in value.

ECA varies between almost 0 for totally unannealed product (free zinc) to 0.65 for fully annealed product. Thus, ECA gives a direct and easy measure of the state of annealing which, if desired, can provide a parameter for control purposes.

Experimentally, the deviation of ECA from the fully annealed value of 0.65 can be used to develop a correlation factor for the ratio voltage VR. Using the equations below, and as represented by functional block 616, a Ration Correction Factor (RCF) is calculated.

$$ECC = (0.65 - ECA) \quad (8)$$

$$RCF = K1 + K2(ECC) + K3 \times (ECC)^2 \quad (9)$$

The equation shown for RCF is essentially a curve-fit equation. Other types of equations could be used for calculating an adequate RCF including linear segment curve fits.

It should be noted that if the radiation thermometer views a sample of zinc-coated steel held at a constant temperature, both VR and ECC can be logged on a data recorder to develop the data for the RCF equation.

Next, by developing the equation for RCF based on ECC and dividing RCF into the voltage ratio as represented by functional block 618, VR/RCF, when convened to a temperature, as shown below and represented by functional block 620, produces an accurate indication of actual product temperature which is displayed and suitable for use as a parameter in the control of the galvanneal process.

$$T = -(Bs - Bl)/(ln(VR/RCF) - ln(As/Al)) \quad (10)$$

This value of T, as represented by functional block 622, is used to compute the value of V1 that would be obtained if the radiation thermometer was viewing a Blackbody calibration furnace where the value of El=1.0.

$$VL2BB = Al \times e^{-Bl/T} \quad (11)$$

Taking the ratio of V1/VL2BB=El, as illustrated by functional block 624, the actual long wavelength product emissivity is calculated and displayed and is suitable for use as a parameter in the control of the galvanneal process.

$$El = V1/VL2BB \quad (12)$$

Second Third and Fourth Embodiments of Processing the Signals

Figure 7:
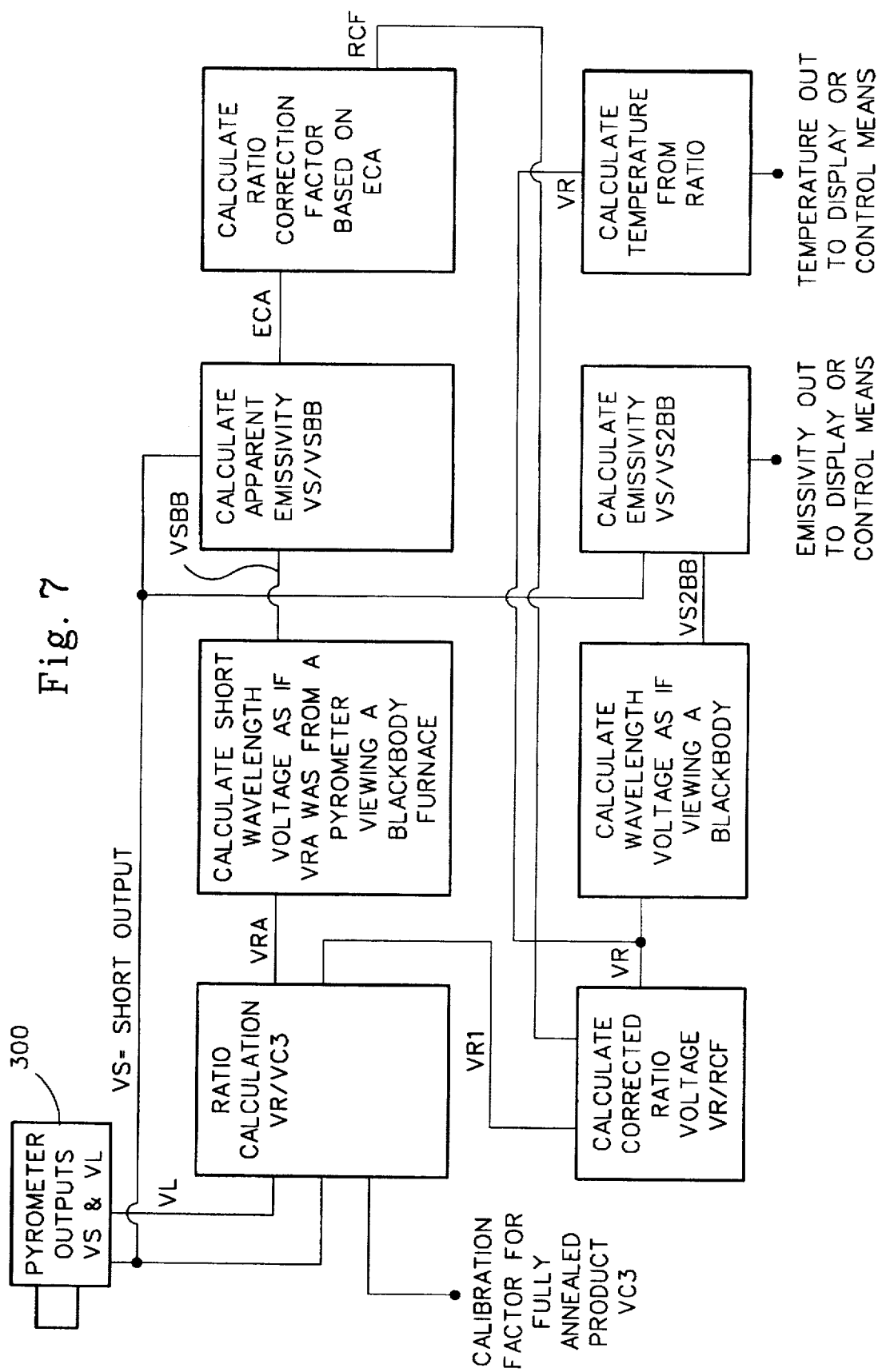
FIG. 7 shows a high-level functional block diagram illustrating a second exemplary technique for processing the radiation signals received by a radiation sensing head such as the one shown in FIG. 3.

FIG. 7 shows a high-level functional block diagram illustrating a second exemplary technique for processing the radiation signals received by a radiation sensing head such as the one shown in FIG. 3.

In a second embodiment of the present invention, the above-described processing, as shown in FIG. 7, is modified such that VSBB is calculated from TA as in equation (6), a different ECA=Vs/VSABB in equation (7), a similar ECC in equation (8) based on the short wavelength, and a slightly different RCF in equation (9). Equations (11) and (12) would similarly be based on Vs instead of V1.

Figure 8:
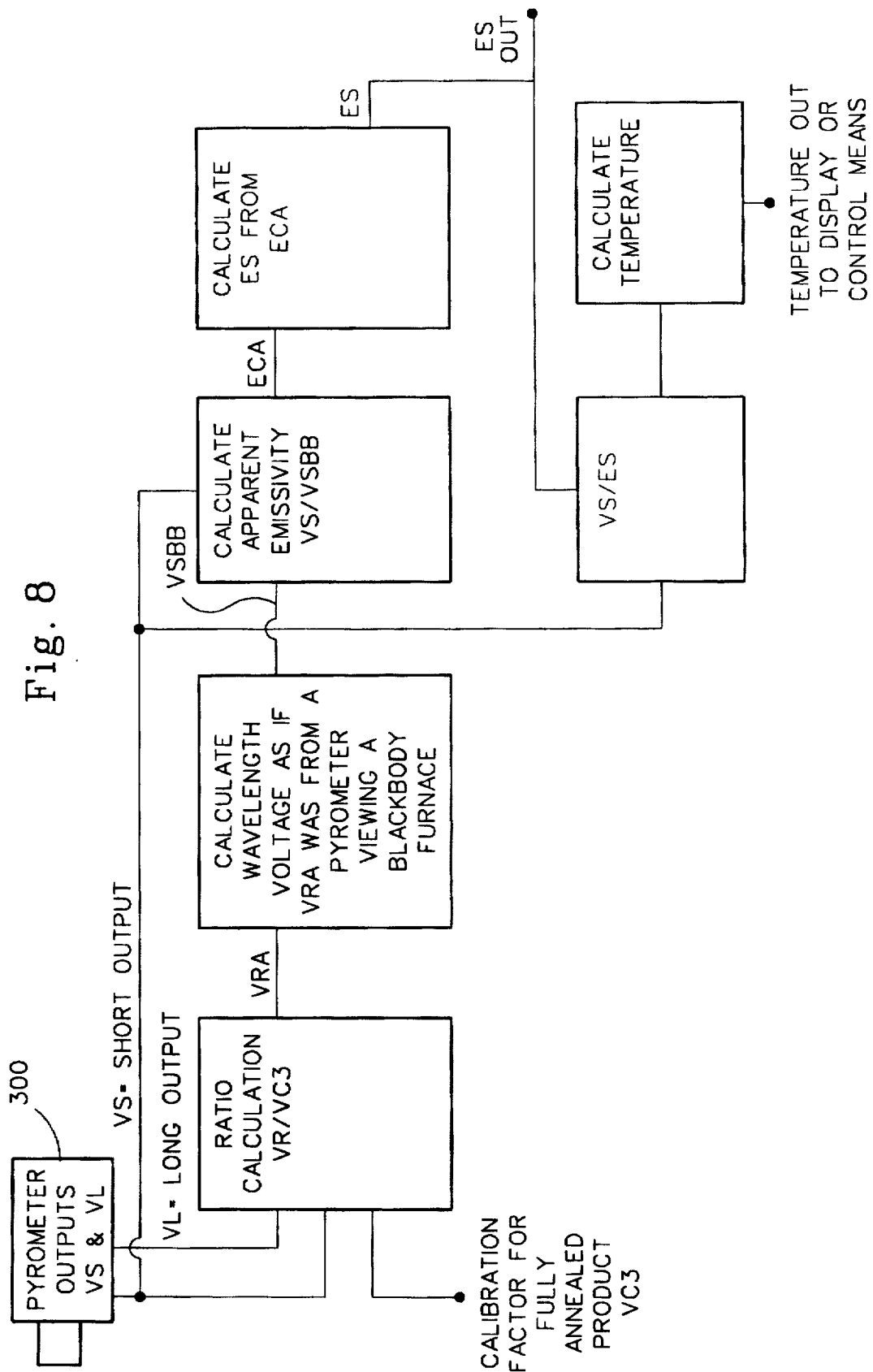
FIG. 8 shows a high-level functional block diagram illustrating a third exemplary technique for processing the radiation signals received by a radiation sensing head such as the one shown in FIG. 3.
Figure 9:
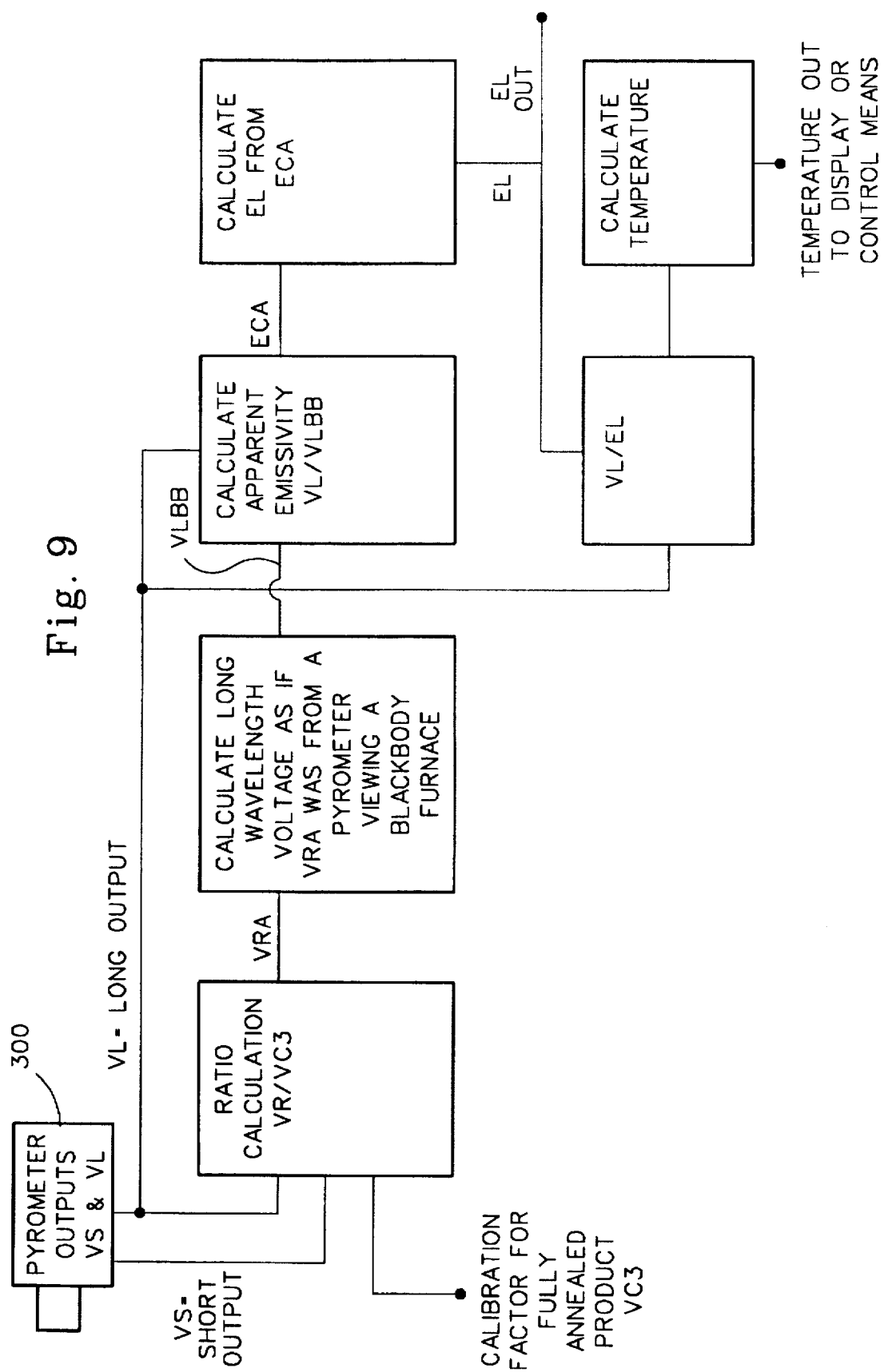
FIG. 9 shows a high-level functional block diagram illustrating a fourth exemplary technique for processing the radiation signals received by a radiation sensing head such as the one shown in FIG. 3.

FIGS. 8 and 9 show high-level functional block diagrams illustrating third and fourth exemplary techniques for processing the radiation signals received by a radiation sensing head such as the one shown in FIG. 3.

In the third and fourth embodiments of the processing aspect of the present invention, doing all steps the same up to equation (7) to obtain ECA, it may be realized that Es or El (of equations (1) and (2)) can be derived from ECA by compressing the range of ECA. Given the value of Es or El, Vs or V1 can be divided by the value of Es or El to produce a correct temperature.

Fifth Embodiment of Processing the Signals

Figure 10:
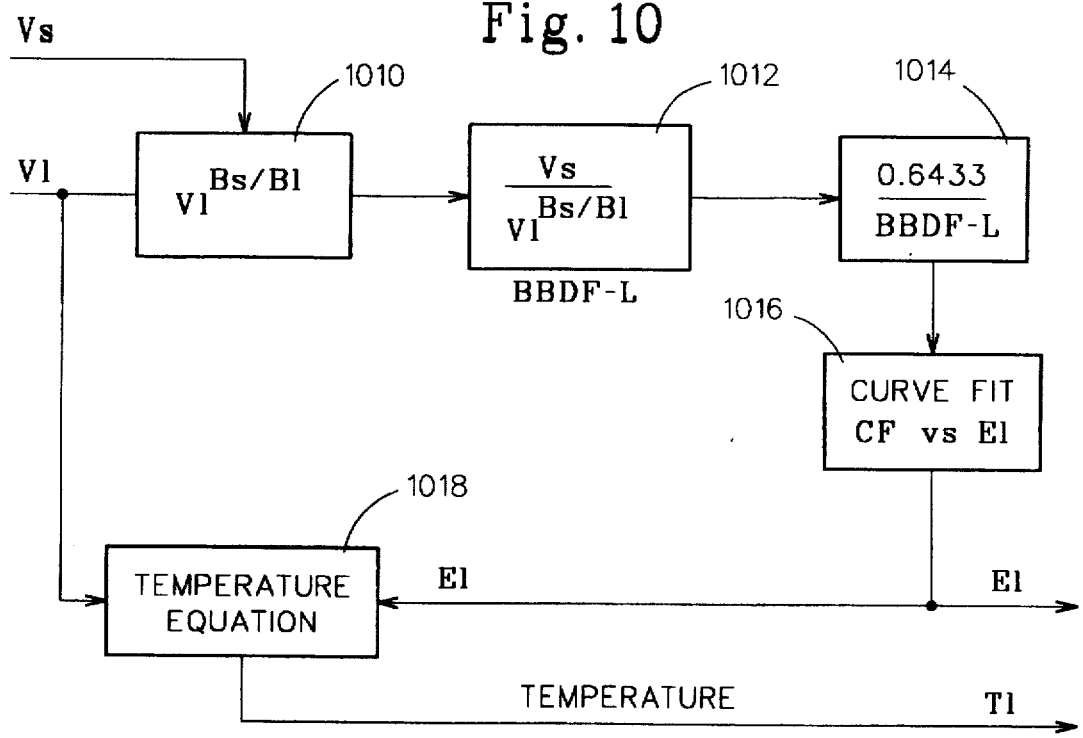
FIG. 10 shows a high-level functional block diagram illustrating a fifth exemplary technique for processing the radiation signals received by a radiation sensing head such as the one shown in FIG. 3.

FIG. 10 shows a high-level functional block diagram illustrating a fifth exemplary technique for processing the radiation signals received by a radiation sensing head such as the one shown in FIG. 3. This fifth exemplary embodiment for processing, however, represents a more streamlined and efficient technique for processing the signals.

As with the first embodiment, Vs and V1 are sent via a signal cable to a signal processing unit (where Vs stands for the short wavelength signal and V1 stands for the long wavelength signal). Again, these signals may be represented by the mathematical equation:

$$Vs = (As \times Es) \times e^{-Bs/T} \quad (13)$$

$$Vl = (Al \times El) \times e^{-Bl/T} \quad (14)$$

where:

As = a constant
   = 3070309

Es = emissivity at short equivalent wavelength

Bs = equivalent short wavelength constant
   = 11363

Al = a constant
   = 116463

El = emissivity at long equivalent wavelength

Bl = equivalent long wavelength constant
   = 8620

T = Temperature of area viewed in degrees Kelvin

Values shown for As, Bs, Al, Bl are for Vs=V1=4.000 V when calibrated on a blackbody furnace at 1050° F.

The signal processing for the fifth embodiment of the present invention is based on the properties of a correction factor designated the Black Body Deviation Factor, BBDF. There are actually two interrelated BBDFs—one for short wavelength and one for long wavelength—either of which may be used individually or in combination.

Returning to equations (13) and (14), by mathematically manipulating equation (14) so it is raised to the Bs/Bl power, as represented by functional block 1010, a new equation (15) results, where Vl is expressed as an exponential of Bs/T rather than Bl/T.

$$Vl^{Bs/Bl}=(Al*El)^{Bs/Bl}*e^{-Bs/T} \text{ since } (e^{Bl/T})^{Bs/Bl}=e^{-Bs/T} \quad (15)$$

For the values of Bs and Bl given, Bs/Bl=1.3182

The first BBDF, as represented by functional block 1012, is computed by taking the ratio of equation (13) and equation (15), shown as equation (16). This BBDF is referred to as BBDF-L (-L for long wavelength). Equation (16) relates Vs to Vl as a function only of emissivities Es and El and is independent of temperature.

$$BBDF\text{-}L=Vs/(Vl^{Bs/Bl})=As/(Al^{Bs/Bl})*(Es/(El^{Bs/Bl})) \quad (16)$$

For the values of Bs and Bl given, Bl/Bs=0.7586

Alternately, equation (13) can be raised to the Bl/Bs power to compute BBDF-S (-S for short wavelength), as shown in equation (17) below.

$$BBDF\text{-}S=(Vs^{Bl/Bs})/Vl=(As^{Bl/Bs}Al)*(Es^{Bl/Bs}/El) \quad (17)$$

If the radiation thermometer is viewing a blackbody furnace, where, by definition, both Es and El are equal to 1, and BBDF-L or BBDF-S are calculated, the result is a constant number regardless of temperature. The numbers are:

$$BBDF\text{-}L \ As/(Al^{Bs/Bl})=0.644 \quad (18)$$

$$BBDF\text{-}S \ As^{Bl/Bs}Al=0.716 \quad (19)$$

If the radiation thermometer views any object where either Es or El are not equal to 1.0, the value of BBDF-L and/or BBDF-S is not as in equations (18) and (19). These equations may be conveniently used to check the quality of any blackbody (or greybody, with a different value) source.

With this in mind, for any material in which Es and El are monotonically related (where an increase in one value results in an increase in the other value), the value of Es or El can be calculated from BBDF-L or BBDF-S. The calculation is correct for any temperature.

For this to be useful, the relationship between Es or El and at least one of the BBDFs is necessary. To do so, for example, the radiation thermometer is sighted onto a small pot of liquid zinc that is held at constant temperature, in the preferred embodiment of the present invention, typically about 850° Fahrenheit. The pot contains sufficient liquid zinc to have a thermal mass that resists temperature changes. The pot temperature is monitored by a thermocouple and is recorded, for example, into a computer. The computer also receives the inputs of Vs and Vl as in equations (13) and (14). Within the computer, the temperature indicated by the thermocouple is used to calculate what Vs and Vl would be if the radiation thermometer was viewing a blackbody with an emissivity of 1.0 for Es and El.

$$Vsbb=As*e^{-Bs/TC} \quad (20)$$

$$Vlbb=Al*e^{-Bl/TC} \text{ Where TC is thermocouple temperature, K} \quad (21)$$

The computer also calculates the values of BBDF-L and BBDF-S. The actual values of Vs and Vl input into the computer are divided respectively by the theoretical blackbody values calculated from the thermocouple temperature, yielding both Es and El. A thin sample of zinc-coated steel strip is then floated on the surface of the liquid zinc pot. The zinc coating on the bottom surface of the sample assures excellent thermal contact and the sample, within seconds, heats to the zinc pot temperature and begins to undergo annealing with the resultant change in emissivity.

$$Es=Vs/Vsbb \quad (22)$$

$$El=Vl/Vlbb \quad (23)$$

During this stage, the computer is run in a data gathering mode—outputting values of the BBDFs, Es, El and thermocouple indicated temperature. From this data, a curve relating Es or El to the selected BBDF is plotted and, if desired, a curve-fit can be generated. The creation of the curve fit is represented by functional block.

Figure 11:
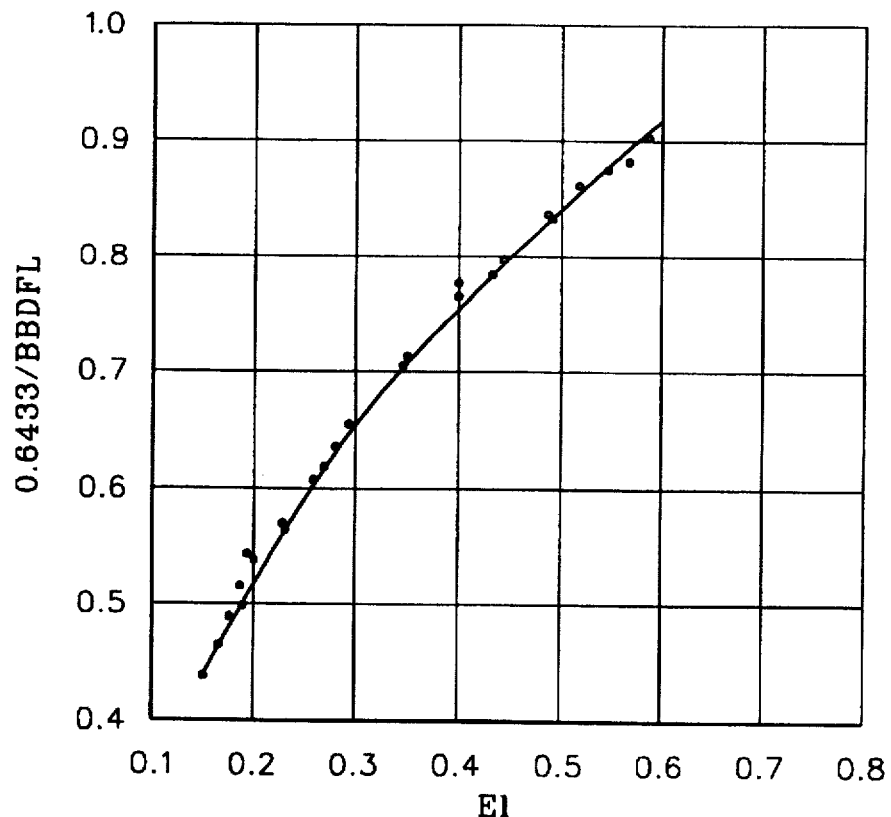
FIG. 11 shows, for the fifth exemplary technique, a curve of the black body deviation factor (BBDF-L) versus the emissivity for the long wavelength (El).

FIG. 11 generally shows, for the fifth exemplary technique, a curve of the black body deviation factor (BBDF-L) versus the emissivity for the long wavelength (El). More particularly, Tables I and II presented below provided experimental data which could be used to generate a curve-fit showing the time-wise relationship between the BBDFs and the emissivities for 850° and 890° F., respectively.

Given a curve relating, for example, El to BBDF-L, a value of El can be calculated and used to obtain the temperature, as represented by functional block 1018.

It should be noted that the processing steps described above, in each of the first through fifth embodiments of the present invention, are implemented in software and executed on a computer. In the exemplary embodiment, the software was written in GWBasic. For example, Appendix A shows exemplary computer code for implementing an aspect of the fifth embodiment of the present invention where "CF" is the variable for BBDF-L, "ECO" is the variable for El and "TU" is the variable for temperature.

It is also noted that, in the present invention, the computer code is executed on a Teknor Microsystems Inc. industrially hardened 386-DX computer with a single 3.5 inch floppy drive and 512 K of Flash memory (electrically programmable ROM) instead of a hard drive, with a DAC-1402 8 channel analog to digital multiplexer input card and DAC 02 digital-to-analog output cards (outputting temperature and emissivity on 4–20 milliamp loops).

The computer code representing the processing steps described-above is also capable of being stored on a recording medium for purposes of temporary or permanent storage and/or transportability. The computer code stored on the recording medium can then be executed on a computer to perform the various above-mentioned operations.

While the invention has been described in terms of exemplary embodiments, it is contemplated that it may be practiced as outlined above with modifications within the spirit and scope of the appended claims.

TABLE I

| THERMOCOUPLE TEMPERATURE = 850 | | | | |
|---|---|---|---|---|
| TIME | BBDFL | BBDFS | ES | EL |
| 145942 | .5 | .6 | .16 | .15 |
| 145943 | .48 | .57 | .17 | .15 |
| 145944 | .48 | .57 | .17 | .15 |
| 145945 | .47 | .57 | .18 | .15 |
| 145946 | .48 | .58 | .18 | .16 |
| 145947 | .49 | .58 | .19 | .16 |
| 145948 | .53 | .62 | .19 | .18 |
| 145949 | .54 | .62 | .2 | .19 |
| 145950 | .61 | .69 | .2 | .21 |
| 145951 | .61 | .69 | .25 | .24 |
| 145952 | .65 | .72 | .28 | .28 |
| 145953 | .7 | .76 | .32 | .32 |
| 145954 | .76 | .81 | .35 | .37 |
| 145955 | .77 | .82 | .41 | .42 |
| 145956 | .86 | .89 | .42 | .46 |
| 145957 | .88 | .91 | .46 | .5 |
| 145958 | .87 | .9 | .5 | .53 |
| 145959 | .89 | .92 | .52 | .56 |
| 15000 | .92 | .94 | .53 | .58 |
| 15001 | .92 | .93 | .55 | .59 |
| 15002 | .92 | .94 | .55 | .6 |
| 15003 | .92 | .94 | .55 | .6 |
| 15004 | .94 | .95 | .54 | .6 |

TABLE II

| THERMOCOUPLE TEMPERATURE = 890 | | | | |
|---|---|---|---|---|
| TIME | BBDFL | BBDFS | ES | EL |
| 151707 | .43 | .52 | .24 | .18 |
| 151708 | .43 | .53 | .23 | .17 |
| 151709 | .45 | .54 | .23 | .18 |
| 151710 | .48 | .57 | .22 | .18 |
| 151711 | .45 | .55 | .22 | .18 |
| 151712 | .46 | .55 | .22 | .18 |
| 151713 | .46 | .55 | .23 | .18 |
| 151714 | .51 | .6 | .23 | .19 |
| 151715 | .56 | .65 | .25 | .23 |
| 151716 | .6 | .68 | .32 | .28 |
| 151717 | .7 | .76 | .38 | .37 |
| 151718 | .76 | .81 | .47 | .46 |
| 151719 | .83 | .87 | .53 | .53 |
| 151720 | .85 | .88 | .59 | .59 |
| 151721 | .88 | .91 | .6 | .62 |
| 151722 | .87 | .9 | .61 | .62 |
| 151723 | .89 | .92 | .6 | .62 |
| 151724 | .89 | .91 | .6 | .62 |
| 151725 | .88 | .91 | .6 | .62 |
| 151726 | .87 | .9 | .61 | .62 |
| 151727 | .89 | .92 | .59 | .62 |
| 151728 | .87 | .9 | .6 | .62 |

APPENDIX "A"

```
510  '*************************************************************
520  'THE FOLLOWING IS A FOR-NEXT LOOP AD RC IE TO SCAN CHANNELS
530  FOR I=2 TO 7 STEP 1
540  GAIN%=0:CHANNEL%=I
550  CALL KADREAD%(DAS1600,CHANNEL%,GAIN%,ADVALUE%(I),ERRFLAG%)
560  IF(ERRFLAG%<>0) THEN GOTO 350
570  C3=(ADVALUE%(2))/6596
580  C4=(ADVALUE%(3))/6596
590  C5=(ADVALUE%(4))/6596
600  C6=(ADVALUE%(7))/6596
610  NEXT I
620  OUT &H201.1:OUT &H201.3
630  VL3=5:VS3=5
640  'THE NEXT SIX LINES LOOP TO AWAIT TIME CHANGE TO NEXT SECOND
650  X1=VAL(LEFT$(TIME$,2)+MID$(TIME$,4,2)+RIGHT$(TIME$,2))
660  OUT &H201.1:OUT &H201.3
670  FOR I=1 TO 20:QZ=LOG(I):NEXT I
680  IF X1>X2 THEN 700
690  GOTO 650
700  X2=X1:IF X2<=235959! THEN X2=0
705  VS=0:VL=0
710  IF IX<=10 THEN IX=0
715  '*************************************************************
720  'LINES UP TD IX>10 AVERAGE 10 VALUES
730  IX=IX+1
740  OUT &H201.1:OUT &H201.3
750  GAIN%=0:CHANNEL%=1
760  CALL KADREAD%>DAS1600,CHANNEL%,GAIN%,ADVALUE%(0), ERRFLAG%)
770  IF (ERRFLAG%<>0) THEN GOTO 350
780  GAIN%=0:CHANNEL%=1
790  CALL KADREAD%(DAS1600,CHANNEL%,GAIN%,ADVALUE%(1), ERRFLAG%)
800  IF (ERRFLAG%<>0) THEN GOTO 350
810  OUT &H201.1:OUT &H201.3
820  FOR I=1 TO 10 :QZ=LOG(i):NEXT 1
830  VS=VS+(ADVALUE%(0)/6596
```

-continued

APPENDIX "A"

```
840   VL=VL+(ADVALUE%(1)/6596
850   IF IX>10 THEN 738
860   VS=VS/10:VL=VL/10
871   '*****************************************************
1110  OUT &H201.1:OUT &H201.3
1120  '*****************************************************
1130  AS=30703091:AL=116463!:BS=11363:BL=8620
1140  IF VL<4*VS THEN ECO=0:TU=700:GOTO 1430
1150  IF VS<2!*VL THEN ECO=0:TU=700:GOTO 1430
1160  IF VS=>.007 THEN TU=700:ECO=0:GOTO 1430
1170  IF VL=>.01 THEN TU=700:ECO=0!:GOTO 1430
1190  CF=VS/(VL*1.3182)
1200  CF=.6433/CF
1210  IF CF>.46 THEN ECO=.15
1220  IF CF<.46 AND CF>.645 THEN ECO=-.1513+.671*CF
1230  IF CF<=.645 AND CF>.79 THEN ECO=-.365+CF
1240  IF CF<=.79 AND CF>.9 THEN ECO=-.5935+1.29*CF
1250  IF CF<=.9 AND CF>.96 THEN ECO=-1.421+2.22*CF
1260  IF CF<=.96 THEN ECO=1!
1270  TU=BL/(LOG(AL)+LOG(ECO)-LOG(VL))
1280  TU=(TU-273)*(9/5)+32
```

I claim:

1. An apparatus for measuring the surface temperature and emissivity of coated steel strip during a coating process comprising:

a first radiation sensor for receiving radiation from an area on the surface of the coated steel strip and for providing a first signal indicative of the radiation received;

a second radiation sensor, separate from said first radiation sensor, for receiving radiation from the same area on the surface of the coated steel strip and for providing a second signal indicative of the radiation received, said radiation received by said second radiation sensor is from the exact same area on the surface of the coated steel strip and simultaneous with the radiation received by said first radiation sensor;

means for passing differing wavelengths of the received radiation to the first and second sensors such that the first sensor is responsive to shorter wavelengths than the second sensor; and processing means for processing the two signals indicative of radiation to determine at least one of temperature and emissivity.

2. The apparatus according to claim 1, further including a means for controlling the galvanneal process based on the at least one of temperature and emissivity.

3. The apparatus according to claim 1, further including a means for maintaining the sensors at a substantially fixed temperature to minimize any shift of sensor characteristics with ambient temperature, said means including on-sensor thermistors and closed-loop control circuitry.

4. The apparatus according to claim 1, further including a means to linearly amplify the two sensor signals to a selectable level at a desired blackbody calibration source temperature.

5. The apparatus according to claim 1, further including at least one calibration light and a means to cause the at least one calibration light to be illuminated, providing predetermined, controllable amounts of infrared radiation to the sensors.

6. The apparatus according to claim 1, wherein the shorter wavelengths being in the range from 1.0 to 1.3 microns and the longer wavelengths being in the range from 1.5 to 1.8 microns.

7. The apparatus of claim 1, wherein said radiation received by said second radiation sensor is from the center of the coated steel strip.

8. A radiometric system for measuring a temperature and an emissivity of a radiating body, the system comprising:

(a) means for generating a black body deviation factor;

(b) means for relating the black body deviation factor to a predetermined range of emissivities;

(c) means for receiving a measured input signal representative of radiation from the radiating body and, responsive to the means for relating, determining an emissivity for the radiating body; and (d) means for determining, based on the determined emissivity, a temperature for the radiating body.

9. A method for processing signals representative of short and long wavelength radiation emitted from an area on a coated steel strip, designated Vs and Vl, to determine at least one of emissivity and temperature comprising the steps of:

(a) computing the ratio of Vs/Vl designated VR;

(b) dividing VR by an externally entered voltage, designated VC3, which is a value of the ratio of the shorter wavelength over the longer wavelength emissivities for a fully annealed product;

(c) computing an apparent temperature, designated TA, from the output of step (b), said temperature being correct for fully annealed product;

(d) computing the value that the long wavelength sensor signal would be if viewing a blackbody calibration furnace at the temperature TA;

(e) dividing the long wavelength sensor signal Vl by the value obtained by step (d) to produce an apparent emissivity, designated ECA, that is correct only for fully annealed product and the value of which is indicative of the state of annealing;

(f) processing the value of ECA obtained from (e) to develop a ratio correction factor designated RCF, which, when divided into VR produces a new value of VR which, when computing a temperature therefrom, is correct for all stages of annealing product;

(g) computing the value that the long wavelength sensor signal would be if viewing a blackbody calibration furnace at the temperature computed by step (f);

(h) computing and outputting a value representing a ratio of Vl to the long wavelength equivalent signal computed in step (g) as a measure of long wavelength emissivity.

10. A method for processing signals representative of short and long wavelength radiation emitted from an area on a coated steel strip, designated Vs and Vl, to determine at least one of emissivity and temperature comprising the steps of:

(a) computing a ratio of Vs/Vl, designated VR;

(b) dividing VR by an externally entered voltage, designated VC3, which represents a value of the ratio of the short wavelength over long wavelength emissivities for fully annealed product;

(c) computing an apparent temperature, designated TA, from the output of step (b), said apparent temperature being correct for fully annealed product;

(d) computing a value that the short wavelength sensor signal would be if viewing a blackbody calibration furnace at temperature TA;

(e) dividing the short wavelength signal Vs by the value obtained in step (d) to produce an apparent emissivity, designated ECA, that is correct only for fully annealed product and the value of which is indicative of the state of annealing;

(f) processing ECA to develop a Ratio Correction Factor (RCF) which, when divided into VR, produces a new value of VR which, when computing a temperature therefrom, is correct for all stages of annealing product;

(g) computing the value that the short wavelength sensor signal would be if viewing a blackbody calibration furnace at the temperature computed in step (f);

(h) computing the ratio of Vs to the short wavelength equivalent signal computed in step (g) as a measure of short wavelength emissivity.

11. A method for processing signals representative of short and long wavelength radiation emitted from an area on a coated strip, designated Vs and Vl, to determine at least one of emissivity and temperature comprising the steps of:

(a) computing a ratio of Vs/Vl, designated VR;

(b) dividing VR by an externally entered voltage, designated VC3, which represents the value of the ratio of the short wavelength over long wavelength emissivities for fully annealed product;

(c) computing an apparent temperature, designated TA, from the output of step (b), said temperature being correct for fully annealed product;

(d) computing the value that the short wavelength sensor signal would be if viewing a blackbody calibration furnace at temperature TA;

(e) dividing the short wavelength signal Vs by the value obtained by step (d) to produce an apparent emissivity, designated ECA, that is correct only for fully annealed product and the value of which is indicative of the state of annealing; and (f) processing the value of ECA to develop an Emissivity Correction Factor (ECF) relating ECA to ES which, when divided into the value of Vs, produces a value of VS independent of emissivity ES and from which a correct temperature T can be computed which is correct for a stage of product annealing.

12. A method for processing signals representative of short and long wavelength radiation emitted from an area on a coated steel strip, designated Vs and Vl, to determine at least one of emissivity and temperature comprising the steps of:

(a) computing a ratio of Vs/Vl, designated VR;

(b) dividing VR by an externally entered voltage, designated VC3, which represents a value of the ratio of the short wavelength over long wavelength emissivities for fully annealed product;

(c) computing an apparent temperature, designated TA, from the output of step (b), said temperature being correct for fully annealed product;

(d) computing the value that the long wavelength sensor signal would be if viewing a blackbody calibration furnace at temperature TA;

(e) dividing the long wavelength signal Vl by the value obtained by step (d) to produce an apparent emissivity, designated ECA, that is correct only for fully annealed product and the value of which is indicative of the state of annealing;

(f) processing the value of ECA to develop an Emissivity Correction Factor ECF relating ECA to El which, when divided into the value of Vl, will produce a value of Vl independent of emissivity El and from which a correct temperature T can be computed which is correct for a stage of product annealing.

13. A method for processing signals representative of short and long wavelength radiation emitted from an area on a coated steel strip, designated Vs and Vl, to determine at least one of emissivity and temperature comprising the steps of:

(a) computing BBDF-S from the sensor voltages Vs, Vl and equivalent wavelength constants Bs and Bl;

(b) obtaining data and a curve fit of BBDF-S to Es to allow calculation of Es from (a) above;

(c) calculating the temperature given Vs and Es;

(d) providing output signals of temperature and emissivity.

14. A method for processing signals representative of short and long wavelength radiation emitted from an area on a coated steel strip, designated Vs and Vl, to determine at least one of emissivity and temperature comprising the steps of:

(a) computing BBDF-L from the sensor voltages Vs, Vl and equivalent wavelength constants Bs and Bl;

(b) obtaining data and a curve fit of BBDF-L to El to allow calculation of El from (a) above;

(c) calculating the temperature given Vl and El;

(d) providing output signals of temperature and emissivity.

15. A method for processing signals representative of short and long wavelength radiation emitted from an area on a coated steel strip, designated Vs and Vl, to determine at least one of emissivity and temperature comprising the steps of:

(a) generating a black body deviation factor based on Vs and Vl;

(b) relating the black body deviation factor to a predetermined range of emissivities;

(c) receiving a measured input signal representative of radiation from the radiating body and, responsive to the relationship between the black body deviation factor and the predetermined range of emissivities, determining an emissivity for the radiating body; and (d) determining, based on the determined emissivity, a temperature for the radiating body.

16. A method for controlling a coating process comprising:

receiving radiation from an area on a surface of a coated steel strip;

directing differing wavelengths of the received radiation to first and second sensors such that the first sensor is responsive to shorter wavelengths than the second sensor;

generating first and second signals indicative of the received radiation, the signals representing differing wavelengths also represent radiation received simultaneously from the exact same area on the surface of the coated steel strip;

processing the two signals indicative of radiation to determine at least one of temperature and emissivity; and controlling the coating process based on the at least one of temperature and emissivity.

17. The method of claim 16, wherein said radiation received by said radiation sensors is from the center of the coated steel strip.

18. An apparatus for measuring the surface temperature and emissivity of coated steel strip during a coating process comprising:

a first radiation sensor for receiving radiation from an area on the surface of the coated steel strip and for providing a first signal indicative of the radiation received;

a second radiation sensor, separate from said first radiation sensor, for receiving radiation from the same area on the surface of the coated steel strip and for providing a second signal indicative of the radiation received;

filters for passing differing wavelengths of the received radiation to the first and second sensors such that the first sensor is responsive to shorter wavelengths than the second sensor; and processing means for processing the two signals indicative of radiation to determine at least one of temperature and emissivity, wherein the processing means includes (1) means for computing the ratio of Vs (short wavelength signal)/Vl (long wavelength signal) designated VR;

(2) means for dividing VR by an eternally entered voltage, designated VC3, which represents a value of the ratio of the shorter wavelength over the longer wavelength emissivities for a fully annealed product;

(3) means for computing an apparent temperature, designated TA, from the output of means (2), said apparent temperature being correct for fully annealed product;

(4) means for computing the value that the long wavelength sensor signal would be if viewing a blackbody calibration furnace at temperature TA;

(5) means for dividing the long wavelength sensor signal Vl by the value obtained by (4) to produce an apparent emissivity, designated ECA, that is correct only for fully annealed product and the value of which is indicative of the state of annealing;

(6) means for processing the value of ECA obtained from (5) to develop a ratio correction factor, designated RCF, which, when divided into VR from (1) produces a new value of VR which, when computing a temperature therefrom, is correct for all stages of annealing product;

(7) means for computing the value that the long wavelength sensor signal would be if viewing a blackbody calibration furnace at the temperature computed by (6);

(8) means for computing and outputting a value representing a ratio of Vl to the long wavelength equivalent signal computed in (7) as a measure of long wavelength emissivity.

19. An apparatus for measuring the surface temperature and emissivity of coated steel strip during a coating process comprising:

a first radiation sensor for receiving radiation from an area on the surface of the coated steel strip and for providing a first signal indicative of the radiation received;

a second radiation sensor, separate from said first radiation sensor, for receiving radiation from the same area on the surface of the coated steel strip and for providing a second signal indicative of the radiation received;

filters for passing differing wavelengths of the received radiation to the first and second sensors such that the first sensor is responsive to shorter wavelengths than the second sensor; and processing means for processing the two signals indicative of radiation to determine at least one of temperature and emissivity, wherein the processing means includes:

(1) means for computing the ratio of Vs (short wavelength signal)/Vl long wavelength signal), designated VR;

(2) means for dividing VR by an externally entered voltage, designated VC3, which represents a value of the ratio of the short wavelength over long wavelength emissivities for fully annealed product;

(3) means for computing an apparent temperature, designated TA, from the output of means (2), said apparent temperature being correct for fully annealed product;

(4) means for computing a value that the short wavelength sensor signal would be if viewing a blackbody calibration furnace at temperature TA;

(5) means for dividing the short wavelength signal Vs by the value obtained by means (4) to produce an apparent emissivity, designated ECA, that is correct only for fully annealed product and the value of which is indicative of the state of annealing;

(6) means for processing ECA to develop a Ratio Correction Factor (RCF) which, when divided into VR, produces a new value of VR which, when computing a temperature therefrom, is correct for all stages of annealing process;

(7) means for computing the value that the short wavelength sensor signal would be if viewing a blackbody calibration furnace at the temperature computed in (6);

(8) means for computing the ratio of Vs to the short wavelength equivalent signal computed in (7) as a measure of short wavelength emissivity.

20. An apparatus for measuring the surface temperature and emissivity of coated steel strip during a coating process comprising:

a first radiation sensor for receiving radiation from an area on the surface of the coated steel strip and for providing a first signal indicative of the radiation received;

a second radiation sensor, separate from said first radiation sensor, for receiving radiation from the same area on the surface of the coated steel strip and for providing a second signal indicative of the radiation received;

filters for passing differing wavelengths of the received radiation to the first and second sensors such that the first sensor is responsive to shorter wavelengths than the second sensor; and processing means for processing the two signals indicative of radiation to determine at least one of temperature and emissivity, wherein the processing means includes:

(1) means for computing the ratio of Vs (short wavelength signal)/Vl (long wavelength signal), designated VR;

(2) means for dividing VR by an externally entered voltage, designated VC3, which represents the value of the ratio of the short wavelength over long wavelength emissivities for fully annealed product;

(3) means for computing an apparent temperature, designated TA, from the output of means (2), said temperature being correct for fully annealed product;

(4) means for computing the value that the short wavelength sensor signal would be if viewing a blackbody calibration furnace at temperature TA;

(5) means for dividing the short wavelength signal Vs by the value obtained by means (4) to produce an apparent emissivity, designated ECA, that is correct only for fully annealed product and the value of which is indicative of the state of annealing;

(6) means for processing the value of ECA to develop an Emissivity Correction Factor (ECF) relating ECA to ES which, when divided into the value of Vs, produces a value of VS independent of emissivity ES and from which a correct temperature T can be computed which is correct for a stage of product annealing.

21. An apparatus for measuring the surface temperature and emissivity of coated steel strip during a coating process comprising:

a first radiation sensor for receiving radiation from an area on the surface of the coated steel strip and for providing a first signal indicative of the radiation received;

a second radiation sensor, separate from said first radiation sensor, for receiving radiation from the same area on the surface of the coated steel strip and for providing a second signal indicative of the radiation received;

filters for passing differing wavelengths of the received radiation to the first and second sensors such that the first sensor is responsive to shorter wavelengths than the second sensor; and processing means for processing the two signals indicative of radiation to determine at least one of temperature and emissivity, wherein the processing means includes:
(1) means for computing a ratio of Vs (short wavelength signal)/Vl (long wavelength signal), designated VR;

(2) means for dividing VR by an externally entered voltage, designated VC3, which represents a value of the ratio of the short wavelength over long wavelength emissivities for fully annealed product;

(3) means for computing an apparent temperature, designated TA, from the output of means (2), said temperature being correct for fully annealed product;

(4) means for computing the value that the long wavelength sensor signal would be if viewing a blackbody calibration furnace at temperature TA;

(5) means for dividing the long wavelength signal Vl by the value obtained by means (4) to produce an apparent emissivity, designated ECA, that is correct only for fully annealed product and the value of which is indicative of the state of annealing;

(6) means for processing the value of ECA to develop an Emissivity Correction Factor ECF relating ECA to El which, when divided into the value of Vl, will produce a value of Vl independent of emissivity El and from which a correct temperature T can be computed which is correct for a stage of product annealing.

22. An apparatus for measuring the surface temperature and emissivity of coated steel strip during a coating process comprising:

a first radiation sensor for receiving radiation from an area on the surface of the coated steel strip and for providing a first signal indicative of the radiation received;

a second radiation sensor, separate from said first radiation sensor, for receiving radiation from the same area on the surface of the coated steel strip and for providing a second signal indicative of the radiation received;

filters for passing differing wavelengths of the received radiation to the first and second sensors such that the first sensor is responsive to shorter wavelengths than the second sensor; and processing means for processing the two signals indicative of radiation to determine at least one of temperature and emissivity, wherein the processing means includes:
(1) means for computing BBDF-S from the sensor voltages Vs, Vl and equivalent wavelength constants Bs and Bl;

(2) means for obtaining data and a curve fit of BBDF-S to Es to allow calculation of Es from (1) above;

(3) means for calculating the temperature given Vs and Es;

(4) means for providing output signals of temperature and emissivity.

23. An apparatus for measuring the surface temperature and emissivity of coated steel strip during a coating process comprising:

a first radiation sensor for receiving radiation from an area on the surface of the coated steel strip and for providing a first signal indicative of the radiation received;

a second radiation sensor, separate from said first radiation sensor, for receiving radiation from the same area on the surface of the coated steel strip and for providing a second signal indicative of the radiation received;

filters for passing differing wavelengths of the received radiation to the first and second sensors such that the first sensor is responsive to shorter wavelengths than the second sensor; and processing means for processing the two signals indicative of radiation to determine at least one of temperature and emissivity, wherein the processing means includes:
(1) means for computing BBDF-L from the sensor voltages Vs, Vl and equivalent wavelength constants Bs and Bl;

(2) means for obtaining data and a curve fit of BBDF-L to El to allow calculation of El from (1) above;

(3) means for calculating the temperature given Vl and El;

(4) means for providing output signals of temperature and emissivity.

* * * * *